United States Patent [19]

Capps

[11] 4,119,330
[45] Oct. 10, 1978

[54] JACKKNIFE RESTRAINING MECHANISM

[75] Inventor: Grover H. Capps, Travelers Rest, S.C.

[73] Assignee: Trucksafe, Inc., Taylors, S.C.

[21] Appl. No.: 751,158

[22] Filed: Dec. 16, 1976

[51] Int. Cl.² .................. B62D 53/08; B60T 7/12
[52] U.S. Cl. ......................... 280/432; 188/112 R
[58] Field of Search .............. 280/432; 188/158, 112; 303/20

[56] References Cited

U.S. PATENT DOCUMENTS

| | | | |
|---|---|---|---|
| 1,078,801 | 11/1913 | Munsing | 280/432 |
| 2,130,004 | 9/1938 | Fusetti | 280/432 |
| 2,146,145 | 2/1939 | Huffman | 280/432 |
| 2,213,221 | 9/1940 | Johnson | 280/432 |
| 2,468,705 | 4/1949 | Price | 280/432 |
| 2,499,013 | 2/1950 | Wood | 280/432 |
| 2,564,592 | 8/1951 | Bishop | 280/432 |
| 2,667,364 | 1/1954 | Colpo | 280/432 |
| 2,723,865 | 11/1955 | Leoni | 280/432 |
| 2,772,894 | 12/1956 | Oats | 280/432 |
| 2,962,301 | 11/1960 | Leinbach | 280/432 |
| 3,031,205 | 4/1962 | Fox | 280/432 |
| 3,036,845 | 5/1962 | Till | 280/432 |
| 3,073,623 | 1/1963 | Owen | 280/432 |
| 3,328,051 | 6/1967 | Hope | 280/432 |
| 3,423,135 | 1/1969 | Beltramo | 303/20 |
| 3,430,986 | 3/1969 | Long | 280/432 |
| 3,556,560 | 1/1971 | Adams | 280/432 |
| 3,580,610 | 5/1971 | Warren | 280/432 |
| 3,592,488 | 7/1971 | Holloway | 280/432 |
| 3,667,778 | 6/1972 | Hope | 280/432 |
| 3,722,918 | 3/1973 | Conner | 280/432 |
| 3,751,070 | 8/1973 | Schaffart | 280/432 |
| 3,774,941 | 11/1973 | Durr | 280/432 |
| 3,837,678 | 9/1974 | Cicero | 280/432 |
| 3,874,699 | 4/1975 | Hayes | 280/432 |
| 3,883,160 | 5/1975 | Meyers | 280/432 |
| 3,909,044 | 9/1975 | Henzel | 280/432 |
| 3,972,542 | 8/1976 | Dirks | 280/432 |
| 3,985,369 | 10/1976 | O'Leary | 280/432 |
| 3,989,268 | 11/1976 | Rawn | 280/432 |
| 4,065,149 | 12/1977 | Roth | 280/432 |

Primary Examiner—Joseph F. Peters, Jr.
Assistant Examiner—R. Schrecengost
Attorney, Agent, or Firm—Finnegan, Henderson, Farabow & Garrett

[57] ABSTRACT

A tractor-trailer coupling including a fifth wheel on the tractor pivotally receiving a king pin on the trailer. Cooperable structure is provided between the tractor and trailer which is operable during highway driving to prevent the tractor and trailer from pivoting relative to one another to a sufficient extent to cause vehicle jackknifing. This cooperable structure can be rendered inoperative to allow greater pivotal movement between the tractor and trailer in tight maneuvering conditions. In addition, cooperable stops on the tractor and trailer prevent the tractor and trailer from pivoting so far that their sides can engage and cause damage to the vehicle when the jackknife preventing structure is inoperative. The jackknife preventing structure is rendered operative and inoperative from within the tractor cab.

11 Claims, 11 Drawing Figures

JACKKNIFE RESTRAINING MECHANISM

BACKGROUND OF THE INVENTION

This invention relates to over-the-road vehicles. More particularly, this invention relates to tractor-trailer couplings which serve to control relative pivotal movement allowed between the tractor and trailer to facilitate easy handling of the vehicle in tight maneuvering situations, but which greatly reduces the possibility that the tractor and trailer can jackknife.

This invention can be used in the manufacture of new tractor-trailer vehicles, and can be readily incorporated into existing vehicles. In either case, the invention involves a relatively small amount of expense while providing for safe and maneuverable vehicle operation and reducing the likelihood of vehicle damage.

Conventional tractors and trailers are coupled together for over-the-road operation by a fifth wheel on the tractor in which a king pin on the trailer is pivotally received. This coupling allows the tractor to pull the trailer and allows relative pivotal movement therebetween for maneuvering the vehicle.

A recognized problem with vehicles of this type is that of jackknifing. This occurs when the trailer pivots relative to the tractor to a point where the operator can no longer maintain or recover control of the vehicle.

When these vehicles are in a tight maneuvering situation, it is desirable that the tractor and trailer be able to pivot relative to one another to a somewhat greater extent than is considered necessary or safe when the vehicle is on the highway. However, the allowed pivotal movement in tight maneuvering situations should not be so great that the tractor and trailer sides can contact each other and cause damage to the vehicle.

SUMMARY OF THE INVENTION

It is accordingly, an object of the present invention to provide a new and improved tractor-trailer coupling construction.

It is another object of the invention to provide a tractor-trailer coupling construction having the necessary control for relative pivotal movement allowed so that jackknifing of the vehicle is prevented during highway operation, and yet which facilitates full maneuverability of the vehicle in tight situations while preventing damaging engagement between the tractor and trailer sides.

It is still another object of this invention to provide a coupling construction of the above character which can be provided on new vehicles as well as those already in use, without requiring great expense or extensive modifications, and one which permits easy driver control and operation, preferably from within the tractor cab.

A still further object of the present invention is to provide a tractor-trailer coupling construction of the above character which can readily be incorporated in existing vehicles and which can be designed into new vehicles, all without requiring a large amount of expense or modification of existing standard constructions.

Another object of the present invention is to provide a tractor-trailer coupling construction of the above character which permits the driver to select either highway operation or tight maneuvering operation, and to cause change-over from one to the other from within the tractor cab.

Still another object of the present invention is to provide a tractor-trailer coupling construction of the above character which can prevent the tractor from accidentally pulling out from under the trailer when the king pin and fifth wheel are not properly engaged.

Additional objects and advantages of the invention will be set forth in part in the description, or may be learned by practice of the invention. The objects and advantages of the invention may be realized and attained by means of the instrumentalities and configurations particularly pointed out in the appended claims.

To achieve the foregoing objects and in accordance with the purpose of the invention, as embodied and broadly described herein, this invention comprises a coupling construction for use on a tractor and trailer pivotally and detachably connected by a fifth wheel on the tractor and a king pin on the trailer, said coupling construction comprising first cooperable means on said fifth wheel and said trailer and operable to restrain relative pivotal movement between said tractor and trailer and prevent vehicle jackknifing, control means operable by a driver of the vehicle from within a cab on said tractor to render said first cooperable means operative or inoperative, second cooperable means on said fifth wheel and said trailer and operable, when said first cooperable means is inoperative, to limit the allowed relative pivotal movement between the tractor and trailer to prevent engagement between the sides thereof.

In a first embodiment, the first cooperable means includes a first pair of spaced abutments on the fifth wheel and a movable stop on the trailer positionable between the spaced abutments to limit the allowed relative pivotal movement between the tractor and trailer to a relatively small angle. In this first embodiment, the second cooperable means includes a fixed stop on the trailer engageable with a second pair of spaced abutments on the fifth wheel when the movable stop is out of position between the first abutments.

Desirably, the movable stop is power operated and can use air pressure from the pneumatic brake system for the vehicle, and is controlled from within the tractor cab so as to be easily operated by the driver.

It is also preferred that the abutments be lateral projections formed integral with the fifth wheel, as by welding, bolting, or otherwise, and that the fixed stop also be welded or otherwise rigid with the trailer.

In a second embodiment, the first cooperable means includes electromagnet means on the fifth wheel and operable in response to braking action to draw the fifth wheel and an adjacent trailer plate into tight frictional engagement and restrain relative pivotal movement between the tractor and trailer during braking. The electromagnet means is powered from the electrical circuit for the vehicle and is rendered operative or inoperative from within the vehicle cab.

The invention consists in the novel parts, constructions, arrangement, combinations and improvements shown and described. The accompanying drawings, which are incorporated in and constitute a part of this specification, illustrate two embodiments of the invention, and together with the description, serve to explain the principles of the invention.

DETAILED DESCRIPTION OF THE INVENTION

Reference will now be made in detail to the present preferred embodiments of the invention, examples of which are illustrated in the accompanying drawings.

Figure 1:
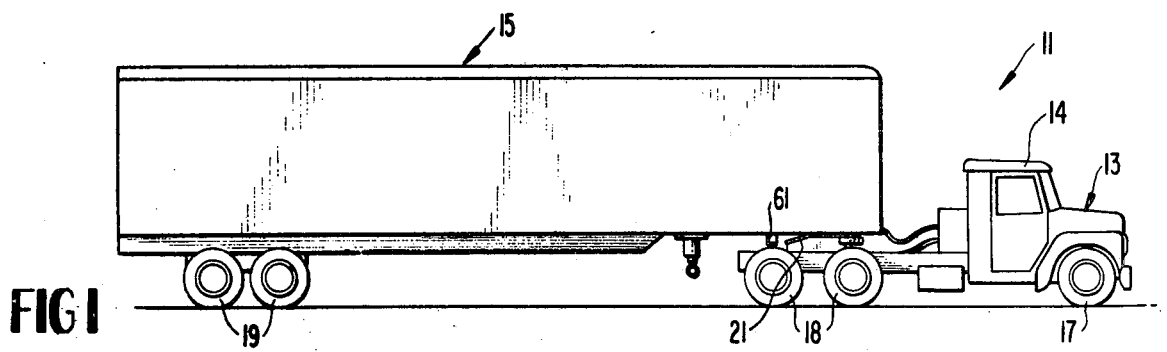
FIG. 1 is a side elevational view showing a tractor and trailer embodying a first form of the invention.
Figure 2:
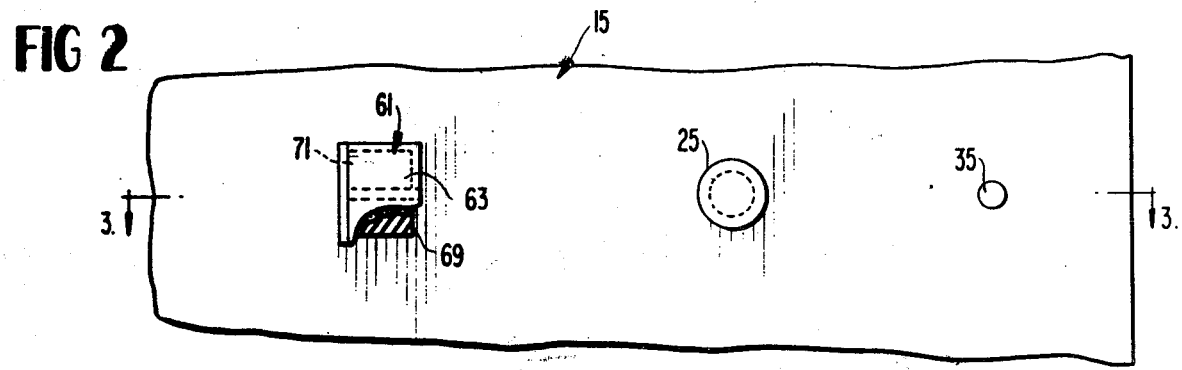
FIG. 2 is an enlarged, bottom plan view of a portion of the trailer of FIG. 1.

Referring now to FIG. 1, a vehicle on which the present invention finds particular use is illustrated generally at 11 and includes a tractor 13 having a cab 14, and a trailer 15, the tractor and trailer being supported for movement over-the-road by sets of wheels 17, 18, and 19. The tractor is provided with a fifth wheel 21 formed with a notch 23 adapted to receive a king pin 25 on the trailer 15 (see also FIGS. 2-4). The connected fifth wheel 21 and king pin 25 form a pivotal connection between the tractor 13 and trailer 15 allowing the tractor to pull the trailer, and facilitating maneuvering of the articulated vehicle 11.

Figure 6:
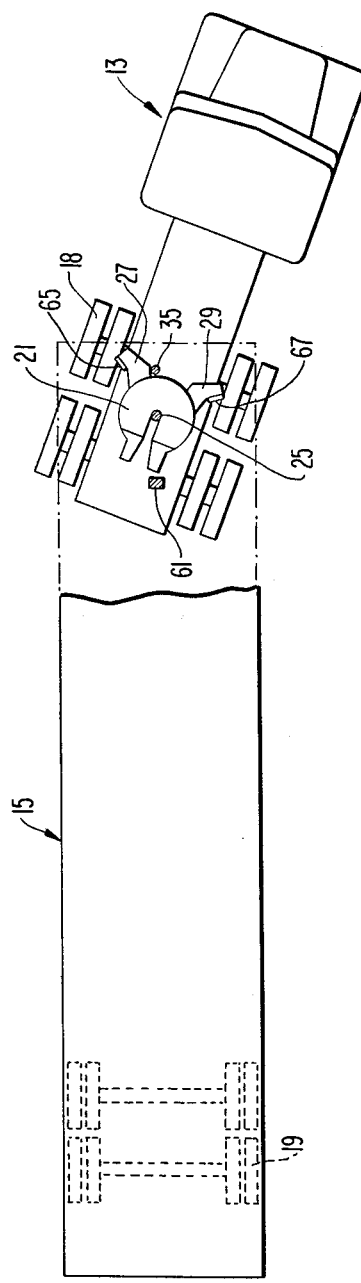
FIG. 6 is a view similar to FIG. 5 and showing the tractor pivoted relative to the trailer to one limit allowed by the first cooperable means.

During normal highway operation of the vehicle 11, the tractor 13 pulls the trailer 15, and steering control is provided by the front pair of tractor wheels 17. Generally, sufficient highway steering control for the vehicle 11 is achieved by pivoting the tractor 13 relative to the trailer through a relatively small angle such as is shown in FIG. 6. Furthermore, if the vehicle 11 goes into a skid condition, the driver will normally be able to recover control without the vehicle jackknifing as long as the trailer 15 has not pivoted relative to the tractor 13 much beyond the angle shown.

Figure 5:
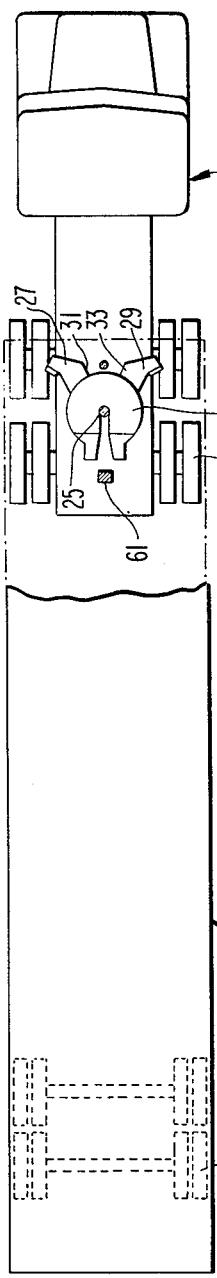
FIG. 5 is a schematic view showing a tractor and trailer embodying the form of the invention of FIGS. 1-4 and with the tractor and trailer aligned.

While this invention is not intended to be so limited, the turning angle for the tractor as illustrated in FIG. 6 is about 20° from the aligned position of FIG. 5, the total turning angle being about 40°.

In accordance with the invention, first cooperable means is provided to restrain the relative pivotal movement between the tractor 13 and trailer 15 to prevent vehicle jackknifing. In this form of the invention, this first cooperable means insures that pivotal motion between the tractor 13 and trailer 15 cannot exceed an angle beyond which the driver can maintain control during highway operation.

Thus, the first cooperable means includes a pair of lateral projections 27, 29 made integral with the fifth wheel 21 as by welding, bolting or by integrally casting. The projections 27, 29 are symmetrically located on the fifth wheel 21 and present opposed inner abutment surfaces 31, 33.

The first cooperable means also includes a movable stop, illustrated as a pin 35 carried by the trailer 15 and located substantially centrally between the surfaces 31, 33 when the king pin 25 and fifth wheel 21 are coupled and the tractor 13 and trailer 11 aligned as shown in FIGS. 1 and 5. The pin is normally biased toward an upward inoperative position by a compression spring 37 caged between a flange 39 on the pin 35 and an end surface 41 on a guide sleeve 43. When so positioned, as shown in full lines in FIG. 3, the pin 35 is withdrawn from between surfaces 31, 33 and does not restrain relative pivotal movement between tractor 13 and trailer 15.

Figure 3:
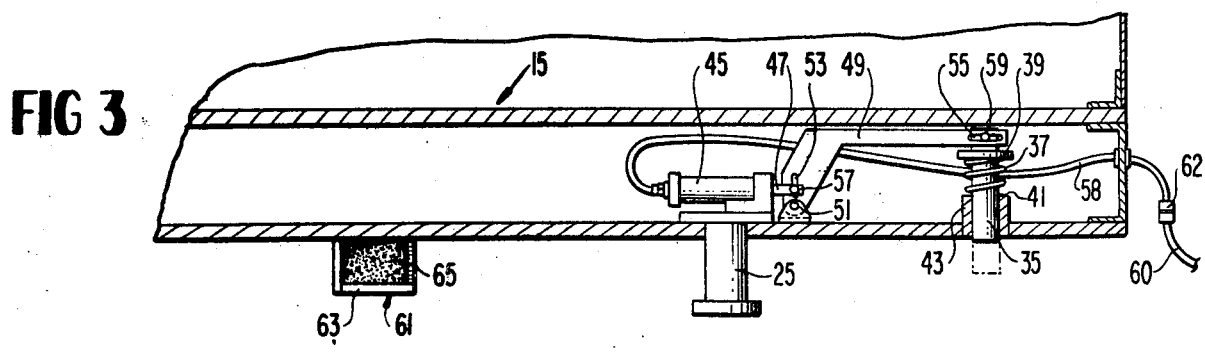
FIG. 3 is sectional view of FIG. 2 taken along the line 3—3 thereof.
Figure 4:
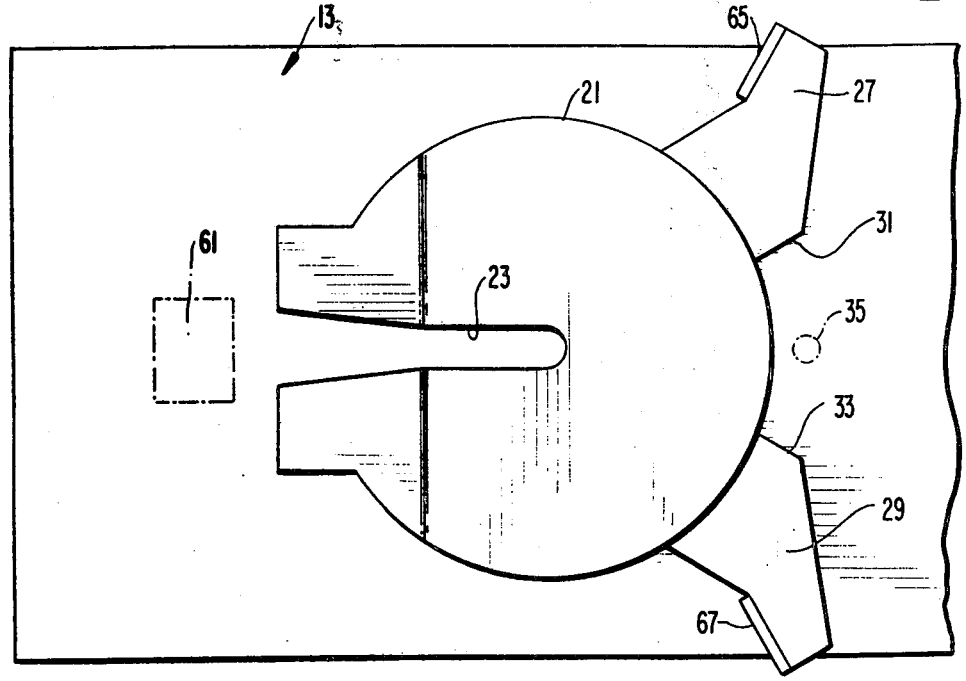
FIG. 4 is an enlarged, top plan view of a portion of the tractor of FIG. 1.

However, the pin 35 is adapted to be moved downwardly against the force of spring 37 to the operative position shown by dot-dash lines in FIG. 3. This is achieved by power means, for example, a pneumatic motor 45 having a linearly movable piston rod 47. A connecting link 49 pivoted on the trailer 15 by a pin 51 has a pair of slots 53, 55 receiving pins 57, 59 on the rod 47 and pin 35, respectively.

When the motor 45 is actuated to move the piston rod 47 toward the right, as seen in FIG. 3, connecting link 49 pivots in a clockwise direction and moves pin 35 downwardly. This moves the pin 35 into an operative position between the surfaces 31, 33 on projections 27, 29 where it limits the extent of pivotal movement allowed between the tractor 13 and trailer 15.

Motor 45 is provided with a supply hose 58 which can be detachably connected by a coupling 62 to another hose 60 communicated with the pneumatic pressure source for the vehicle braking system. The connection between hoses 58, 60 is conveniently made when the other conventional pneumatic and electric connections are made and after the king pin 25 and fifth wheel 21 are coupled. Conveniently, control for motor 45 is provided by a suitable control switch located in the tractor cab 14 for easy actuation by the driver.

Figure 8:
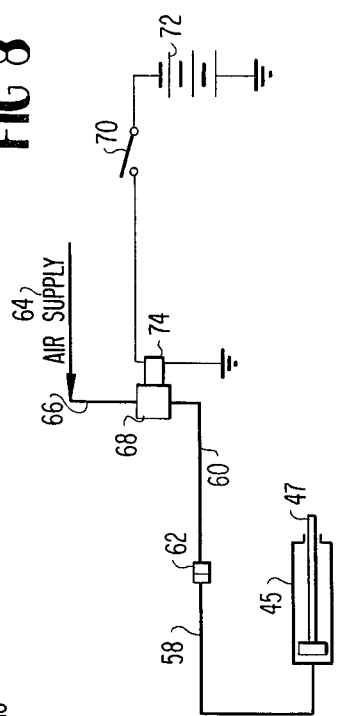
FIG. 8 is a schematic view illustrating a power circuit for the form of the invention of FIGS. 1-7.

A schematic illustration of the power circuitry for the motor 45 is shown in FIG. 8. As shown there, an air supply 64 for the vehicle braking system supplies air pressure to a hose 66. A normally closed valve 68 connects hoses 66, 60. An electrical switch 70 is conveniently provided in the vehicle cab 14 and is in circuit with the vehicle battery 72 and a valve operator 74.

With the switch 70 open, as shown, valve 68 is closed and spring 37 holds piston rod 47 in a left-hand position. When switch 70 is closed, valve operator 74 opens valve 68 so that air supply 64 is connected to motor 45. This causes piston rod 47 to move toward the right, as seen in FIGS. 3 and 8, and pushes pin 35 into the operative position, shown in dot-dash lines in FIG. 3.

It will be appreciated that the tractor 13 and trailer 15 can be fully maneuvered when the pin 35 is in its inoperative position withdrawn from between abutment surfaces 31, 33. This is desirable when the vehicle is in tight maneuvering situations such as at a loading dock, and in general, before the vehicle has reached, or after the vehicle has left, the highway. However, in accordance with the invention, second cooperating means is provided to restrain this allowed pivotal movement when the first restraining means is inoperative, to prevent the tractor and trailer sides from contacting causing damage to the vehicle side parts.

In accordance with the invention, this second cooperative means includes a fixed stop 61 on the trailer adjacent the fifth wheel 21. The fixed stop 61 can include a steel member 63 welded or otherwise suitably rigidly fixed to the trailer 15 and preferably has a pair of rubber or rubber like cushioning blocks 69, 71 on opposite sides of members 63.

The second cooperable means also includes outer opposed abutment surfaces 65, 67 formed on the projections 27, 29 on fifth wheel 21. When the first cooperable means is inoperative and the tractor 13 is pivoted relative to the trailer 15 sufficiently, one of the abutment surfaces 65, 67 will engage the fixed abutment 61 to prevent the sides of tractor 13 and trailer 15 from contacting.

In use, the tractor 13 and trailer 15 are coupled by backing the tractor under the trailer so that the king pin 25 is guided into the slot 23 in fifth wheel 21 and is locked in place as is conventional. At this time, the driver makes the usual air and electrical connections between the tractor and trailer, and, in addition, hoses 58, 60 are connected.

Initially, valve 68 is closed and spring 37 maintains pin 35 in the inoperative position. The driver can be so informed by a suitable panel light or indicator in the tractor cab 14 showing the jackknife restrainer as being in the "off" condition.

Figure 7:
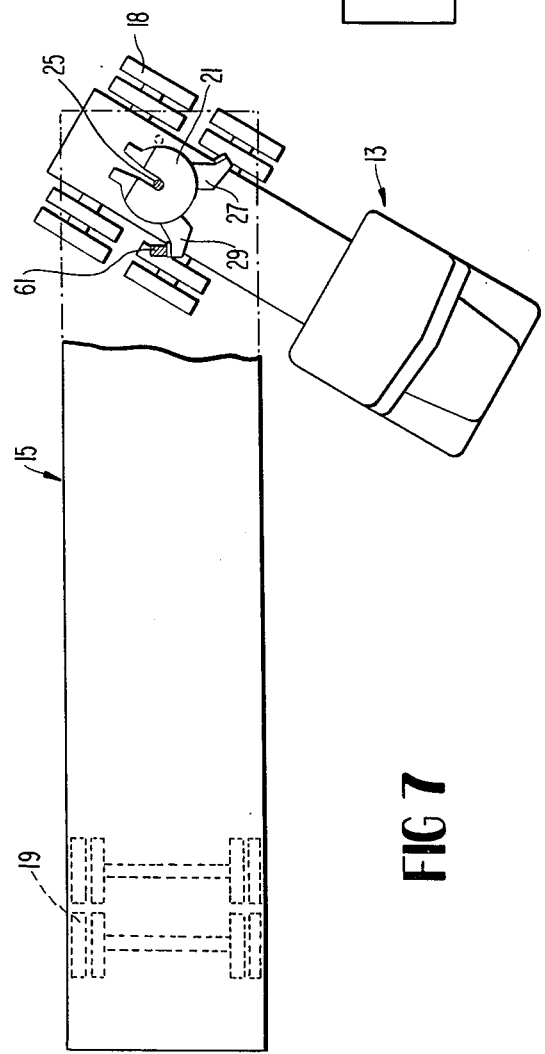
FIG. 7 is a view similar to FIGS. 5 and 6 and showing the tractor and trailer pivoted to the extent permitted by the second cooperable means, with the first cooperable means inoperative.

At this point, the driver can fully maneuver the vehicle 11 through sharp turns and tight situations, the pivotal action between the tractor 13 and trailer 15 being restrained only by stop 61 and abutment surfaces 65, 67. Thus, the tractor 13 and trailer 15 can pivot relative to one another to the extent indicated in FIG. 7.

Upon reaching the highway, the driver can then turn the jackknife restrainer "on" by closing switch 70 from within the cab. This opens valve 68 and connects pneumatic pressure supply 64 to the motor 45 causing the piston rod 47 to move toward the right. As described above, this causes the pin 35 to move into the operative position between projections 27, 29 to confront abutment surfaces 31, 33. Under these conditions, the tractor 13 and trailer 15 can pivot with respect to one another only to the extent allowed by pin 35 and surfaces 31, 33. The extent of this allowed pivotal movement is indicated in FIG. 6, and is sufficient to allow adequate maneuverability of the vehicle on the open road. However, this amount of pivotal movement does not allow the tractor and trailer to pivot relative to one another beyond the point where the driver can normally recover control of the vehicle. The effect of this is to substantially reduce the possibility of the driver losing control of the vehicle thereby preventing the vehicle from jackknifing.

In addition, when the pin 35 is in the operative position, it is adjacent the fifth wheel 21 and serves to prevent the tractor 13 from pulling out from under the trailer 15 should the king pin 25 not be fully engaged in the fifth wheel slot 23.

Figure 9:
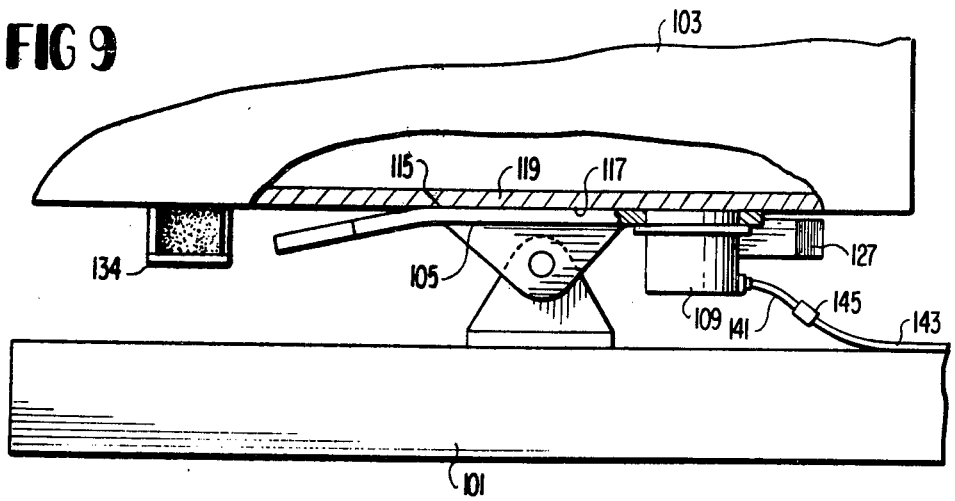
FIG. 9 is a view partly in elevation and partly in section illustrating a portion of a tractor and trailer constructed according to a second form of the invention.
Figure 10:
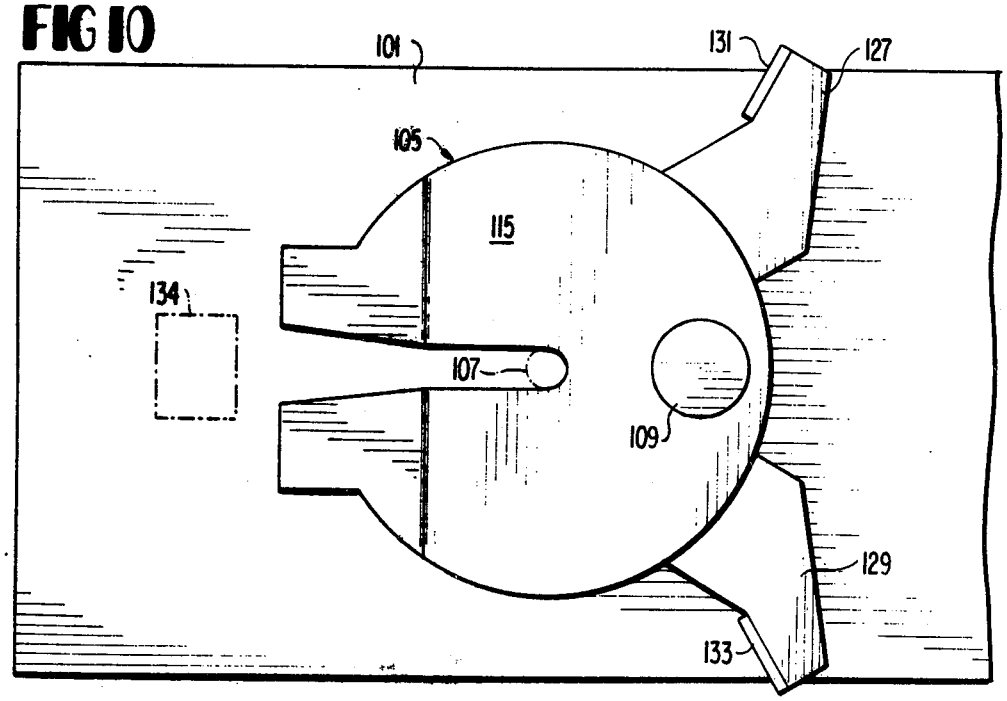
FIG. 10 is a plan view of the fifth wheel of FIG. 9.
Figure 11:
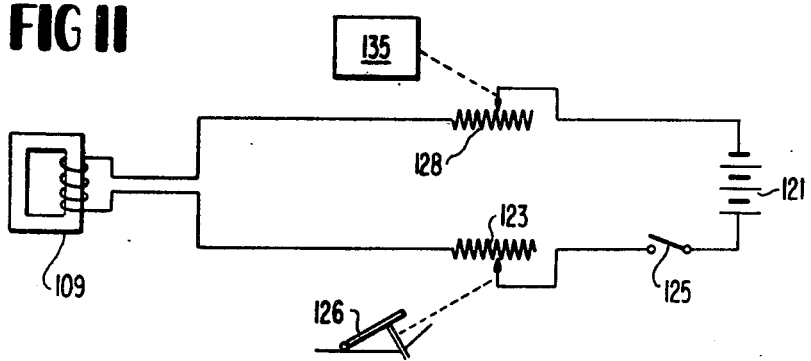
FIG. 11 is a schematic view illustrating power circuit for the form of the invention of FIGS. 9 and 10.

A second form of the invention is shown in FIGS. 9–11. There, portions of a tractor 101 and a trailer 103 are shown coupled by a fifth wheel 105 and a king pin 107.

In accordance with this form of the invention, first cooperable means serving to prevent the vehicle from jackknifing includes electromagnet means shown as one electromagnet 109 secured to the fifth wheel 105. As shown, the electromagnet 109 may extend through an opening in the fifth wheel 105 and be flush with a top surface 115 thereof. Alternatively, the electromagnet may be secured directly against the underside of the fifth wheel, or may be located in a pocket in the fifth wheel underside. The upper surface 115 of fifth wheel 105 is positioned in sliding engagement with a lower surface 117 of a trailer plate 119.

In accordance with the invention, energization of the electromagnet 109 causes the fifth wheel 105 and trailer plate 119 to cooperate and tightly engage at surfaces 115, 117 and restrains relative pivotal movement between the tractor and trailer. When the electromagnet 109 is energized, the magnetic field created causes the plates 105, 119 to be drawn together. This increases the frictional force at plate surfaces 115, 117 sufficient to restrain relative pivotal movement between the tractor and trailer.

When the electromagnet 109 is de-energized, the magnetic field attracting force between plates 105, 119 ceases, and the tractor and trailer can freely pivot relative to one another.

A schematic illustration of the power circuitry for the electromagnet is shown in FIG. 10. Thus, electromagnet 109 is in series with an electrical power source (battery) 121 for the vehicle. In addition, a variable resistor 123 and a switch 125 are also provided in this circuit.

Switch 125 is conveniently provided in the tractor cab for operation by the driver. Variable resistor 123 is mounted to operate in conjunction with a brake pedal 126 in the tractor 101.

Thus, when it is desired to render the first cooperable means operative, such as when the vehicle has reached the highway, the driver closes switch 125. Normal vehicle operation follows, with the tractor and trailer being permitted to pivot freely. However, when the driver applies the brake pedal 126, the impedance of resistor 123 is lowered and raises the current in the circuit so that the magnetic force of electromagnet 109 increases thereby increasing the frictional force between fifth wheel 105 and trailer plate 119 at surfaces 115, 117.

The circuit is designed so that increasing application of the brake pedal 126 causes a higher generated magnetic force in electromagnet 109 and a stronger frictional force between the fifth wheel 105 and trailer plate 119. This increases the resistance to vehicle jackknifing in appropriate situations and renders operation of the vehicle safer.

In addition, the tractor 101 and trailer 103 are also provided with second cooperable means to prevent the vehicle sides from damaging engagement. Thus, like the embodiment of FIGS. 1-8, the fifth wheel 105 has a pair of lateral projections 127, 129 formed with abutment surfaces 131, 133, respectively. The trailer 103 is provided with a cooperable abutment in the form of a fixed stop 134 which may be identical to the stop 61 in the embodiment of FIGS. 1-8. Cooperable engagement between the abutment surfaces 131, 133 and stop 134 limits the allowed pivotal movement between the tractor 101 and trailer 103 to prevent their sides from damaging engagement.

As an alternative to or in addition to the control for the first cooperable means provided by the variable resistor 123 operated in conjunction with brake pedal 126, a rotation sensor 135 (only one shown in FIG. 10) can be provided at each tractor wheel. These sensors 135 generate a signal in the event any one or more of their associated tractor wheels lock during braking. As shown, each sensor 135 is interconnected with a variable resistor 128 such that when one or more of the tractor wheels begins to skid, the impedance in the circuit is lowered raising the current and correspondingly increasing the magnetic force of electromagnet 109 and the frictional force between the fifth wheel 105 and trailer plate 119.

The particular design and configuration, the number and size of the electromagnets 109 required, and the optimum position of those electromagnets will be apparent to or can readily be determined by those skilled in the art. However, it will be understood that maximum frictional force is attained when the thickness of the trailer plate 119 is at least substantially equal to the dimension of the electromagnet field and when that plate 119 is closest to the electromagnet. In some cases, then, it may be desirable to add to the thickness of trailer plate 119 at the area of the fifth wheel 105.

Furthermore, it will be understood that the electromagnet means may be positioned on the trailer plate 119 instead of on the fifth wheel 105, although mounting on the fifth wheel is preferred.

It will be appreciated that the present invention is readily incorporated in existing tractor-trailer constructions, and can be easily designed into new constructions. In either case, the projections 27, 29 (127, 129) are easily added to the fifth wheel 21 (105), and the fixed stop 61 (135) easily mounted on the trailer 15 (103). Furthermore, in the embodiment of FIGS. 1-8, the locking pin 35 and its associated structure and linkages, and the motor 45, are relatively simply and easily added structural components which can be accommodated on virtually all trailers. The same is true for the electromagnet 109 of the embodiment of FIGS. 9 and 10.

Finally, only one extra connection is needed during tractor-trailer coupling in the embodiment of FIGS. 1-8, that connection being hoses 58, 60. In the embodiment of FIGS. 9-11, the electromagnet 104 is connected to the tractor electrical circuit by conductors 141, 143 through coupling 145.

It will be apparent to those skilled in the art that various additions, substitutions, modifications, variations, and omissions may be made in the coupling of the invention without departing from the scope or spirit of the invention.

What is claimed is

1. A coupling construction for use on a tractor and trailer pivotally and detachably connected by a fifth wheel on the tractor and a king pin on the trailer, said coupling construction comprising first cooperable means on said fifth wheel and said trailer and operable to restrain relative pivotal movement between said tractor and trailer and prevent vehicle jackknifing, control means operable by a driver of the vehicle from within a cab on said tractor to render said first cooperable means operative or inoperative, second cooperable means on said fifth wheel and said trailer and operable, when said first cooperable means is inoperative, to limit the allowed relative pivotal movement between the tractor and trailer to prevent engagement between the sides thereof.

2. A coupling construction as defined in claim 1, said first cooperable means including a first pair of spaced abutments on the fifth wheel and a movable stop on the trailer positionable between the spaced abutments to limit the allowed relative pivotal movement between the tractor and trailer to a relatively small angle, said second cooperable means including a fixed stop on the trailer engageable with a second pair of spaced abutments on the fifth wheel when the movable stop is out of position between the first abutments.

3. A coupling construction as defined in claim 2, including an air motor interconnected with said movable stop and powered by air pressure from a pneumatic brake system for the tractor, switch means interconnected with an electric power source for said tractor and operable to actuate said air motor.

4. A coupling construction as defined in claim 2, said abutments being lateral projections formed integral with said fifth wheel, said fixed stop being welded or otherwise rigid with the trailer.

5. A coupling construction as defined in claim 1, said first cooperable means including electromagnet means rigidly mounted on the fifth wheel and operable in response to depression of a brake pedal for said tractor to generate a magnetic field, said trailer including a trailer plate adjacent the fifth wheel and normally spaced therefrom, said trailer plate being within the magnetic field and becoming a part of said electromagnet means upon energization thereof, whereby said fifth wheel and said adjacent trailer plate are drawn into tight frictional engagement to restrain relative pivotal movement between the tractor and trailer during braking, said electromagnet means being powered from the electrical circuit for the vehicle, and switch means rendering said electromagnet means operable or inoperative from within the vehicle cab.

6. A coupling construction for use in a tractor-trailer pivotally and detachably connected by a fifth wheel on the tractor and a king pin on the trailer, said coupling including a pair of projections on said fifth wheel extending outwardly thereof, movable stop means on said trailer movable from an inoperative position withdrawn from said projections to an operative position between said projections, whereby engagement between said movable stop and said projections limits the relative pivotal movement permitted between said tractor and trailer, a fixed stop on said trailer engageable with said projections when said movable stop is in its inoperative position to limit the relative pivotal movement permitted between said tractor and trailer, the angle of pivotal movement permitted by said fixed stop being greater than that permitted by said movable stop in said operative position.

7. A coupling as defined in claim 6 wherein said movable stop includes a pin on said trailer normally biased toward said inoperative position, a pneumatic motor on said trailer and operable to move said pin into said operative position.

8. A coupling as defined in claim 6 wherein said movable stop means is moved from said inoperative to said operative position by a pneumatic motor connected to a pneumatic pressure source for a braking system for said tractor, said pneumatic motor being controlled from within a cab on said tractor.

9. A coupling as defined in claim 6 wherein said movable stop, when in said operative position, is positioned to engage said fifth wheel should said king pin accidentally pull out of said fifth wheel to thereby prevent accidental uncoupling of said tractor and trailer.

10. A coupling construction for use in a a tractor-trailer vehicle pivotally and detachably connected by a fifth wheel on the tractor and king pin on the trailer, said coupling including an electromagnet rigidly mounted on the underside of said fifth wheel, an electric circuit connecting said electromagnet with an electrical source for the vehicle, a switch in said circuit and operable from within said tractor, a variable resistor in said circuit and operable in response to braking of said tractor to vary the current to said electromagnet when said switch is closed, said electromagnet, when energized, generating a magnetic field in proportion to the current, said trailer including a trailer plate adjacent the fifth wheel, said trailer plate being within the magnetic field and becoming a part of said electromagnet upon energization thereof, whereby said trailer plate is drawn into tight frictional engagement with said fifth wheel, the frictional force between said fifth wheel and said trailer plate being proportional to said generated magnetic field, a fixed stop on said trailer engageable with projections on said fifth wheel when said electromagnet is de-energized to limit the relative pivotal movement permitted between said tractor and trailer, and to prevent engagement between the sides thereof.

11. A coupling construction for use in a tractor-trailer vehicle pivotally and detachably connected by a fifth wheel on the tractor and a king pin on the trailer, said tractor having wheels, said coupling including an electromagnet rigidly mounted on the underside of said fifth wheel, an electric circuit connecting said electromagnet with an electrical source for said vehicle, a switch in said circuit and operable from within said tractor, a variable resistor in said circuit and operable in response to loss of tractor at any of the tractor wheels during braking to vary the current to the electromagnet when said switch is closed, said electromagnet, when energized, generating a magnetic field in proportion to the current, said trailer including a trailer plate adjacent the fifth wheel, said trailer plate being within the magnetic field and becoming a part of said electromagnet upon energization thereof, whereby said trailer plate is drawn into tight frictional engagement with said fifth wheel to restrain relative pivotal movement between said tractor and trailer, the frictional force between said fifth wheel and said trailer plate being proportional to said generated magnetic field, a fixed stop on said trailer engageable with projections on said fifth wheel when said electromagnet is de-energized to limit the relative pivotal movement permitted between said tractor and trailer, and to prevent engagement between the sides thereof.

* * * * *